Figure 1:
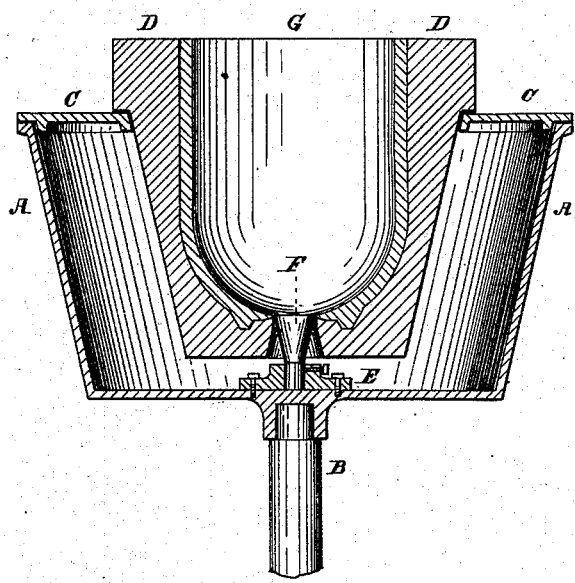

(No Model.)

J. COOK.
JIGGER OR POTTER'S WHEEL.

No. 249,458. Patented Nov. 15, 1881.

Witnesses:
E. W. Stuart
C. P. Cobbs.

Inventor:
Joseph Cook,
by C. P. Humphrey
his Atty.

UNITED STATES PATENT OFFICE.

JOSEPH COOK, OF AKRON, OHIO, ASSIGNOR TO THE AKRON STONEWARE COMPANY, OF SAME PLACE.

JIGGER OR POTTER'S WHEEL.

SPECIFICATION forming part of Letters Patent No. 249,458, dated November 15, 1881.

Application filed April 21, 1881. (No model.)

*To all whom it may concern:*

Be it known that I, JOSEPH COOK, of Akron, in the county of Summit and State of Ohio, have invented a new and useful Improvement in Jiggers or Potters' Wheels, of which the following is a specification.

My invention relates to that class of jiggers or potters' wheels wherein plaster molds adapted to form the outside of the desired ware are connected and revolved with the jigger, the inside of the article being formed by hand or a flat mandrel.

The object of my invention is to provide apparatus whereby vessels, especially those having an opening less than their greatest internal diameter—such as fruit or snuff jars—may be formed ready for the reception of bottoms.

Heretofore it has been customary to form such vessels by hand upon the ordinary potter's wheel.

My invention consists in plaster molds for forming the outside of such vessels in an inverted position, adapted to be connected to and revolved with a turner's wheel, and a mandrel attached to the wheel, adapted to fill the opening in the mold where the opening in the ware is to be left while the ware is being formed; and it also consists of devices whereby mandrels of any desired size may be readily connected with the wheel.

In the accompanying drawings, Figure 1 represents a vertical central section of a potter's wheel and connected parts embodying my invention.

Upon a vertical shaft, B, properly journaled, is attached the cup-shaped metallic jigger-head A, resting upon and fitting in which is the cover C. The office of the cover C is to support and revolve the plaster mold D that forms the outside of the ware, and different covers may be used for the different sizes of ware.

D is a plaster mold, adapted to form in an inverted position the outside of a fruit-jar, G. In the bottom of the mold is an opening of the size, substantially at its smaller part, of the opening to be left in the ware.

In the center of the jigger-head A is attached a socket, E, adapted to receive and hold by means of a set-screw or equivalent device the mandrel F. This mandrel is adapted to substantially fill the smaller part of the orifice in the mold D, and rise to or slightly above the inner surface thereof. By this arrangement the mold and mandrel form a complete cup, in which the plastic material of which the vessel is formed may be powerfully compressed by a mandrel or other device, so as to render the top of the vessel homogeneous with the other parts thereof without allowing the material to escape, and thereby form a bottomless inverted vessel with a mouth less than its greater inside diameter. A bottom is then placed thereon upon an ordinary potter's wheel.

It is apparent that the mandrel F may be permanently attached to the jigger-head, although it will be found preferable to make it removable, as shown, so that any desired size may be used.

By this device various other articles of plastic material—such as hollow pipe-crocks—may be made which have heretofore been constructed solely by hand.

I claim—

1. The combination of a plaster mold for forming the outside of ware of plastic material, having an orifice in the bottom and adapted to fit in and revolve with a jigger-head, and a mandrel attached to said jigger-head adapted to enter and fill said orifice when the mold is placed therein, substantially as shown, for the purpose specified.

2. In combination with a jigger-head adapted to receive plaster molds for forming the outside of ware, a mandrel attached to said jigger-head and adapted to fill an orifice in such mold, substantially as shown, for the purpose specified.

In testimony that I claim the foregoing I have hereunto set my hand this 11th day of April, A. D. 1881.

JOSEPH COOK.

Witnesses:
C. P. HUMPHREY,
E. W. STUART.